United States Patent
Campbell et al.

(12) 
(10) Patent No.: US 6,463,879 B1
(45) Date of Patent: Oct. 15, 2002

(54) INGESTION MONITORING SYSTEM

(75) Inventors: Ronald E. Campbell, Hilliard, OH (US); Michael G. Grigsby, Columbus, OH (US)

(73) Assignee: Jan A. Czekajewski, Hilliard, OH (US)

(*) Notice: Subject to any disclaimer, the term of this patent is extended or adjusted under 35 U.S.C. 154(b) by 0 days.

(21) Appl. No.: 10/010,982

(22) Filed: Dec. 7, 2001

(51) Int. Cl.[7] .............................................. A01K 7/00
(52) U.S. Cl. ................................................... 119/72.5
(58) Field of Search .................... 119/72.5, 72; 222/420

(56) References Cited

U.S. PATENT DOCUMENTS

| | | | | |
|---|---|---|---|---|
| 3,779,430 A | * | 12/1973 | Niki ............................ 222/501 |
| 4,111,198 A | * | 9/1978 | Marx et al. ........... 128/DIG. 13 |
| 4,265,240 A | * | 5/1981 | Jenkins ................ 128/DIG. 12 |
| 4,373,471 A | * | 2/1983 | Coulbourn .................... 119/72 |
| 4,533,347 A | * | 8/1985 | Deckert ....................... 604/250 |
| 4,927,062 A | * | 5/1990 | Walsh ......................... 222/211 |
| 4,934,564 A | * | 6/1990 | Piatt ............................. 222/14 |
| 5,320,250 A | * | 6/1994 | La et al. ......................... 222/1 |
| 5,338,688 A | * | 8/1994 | Deeg et al. .............. 222/146.5 |
| 6,092,699 A | * | 7/2000 | Schmidt .................... 119/72.5 |
| 6,213,354 B1 | * | 4/2001 | Kay ........................... 222/14 |
| 6,422,431 B2 | * | 7/2002 | Pelc et al. ..................... 222/1 |

\* cited by examiner

*Primary Examiner*—Charles T. Jordan
*Assistant Examiner*—Jordan Lofdahl
(74) *Attorney, Agent, or Firm*—Thomas S. Baker, Jr.

(57) ABSTRACT

System apparatus for determining the volume of a potable liquid ingested by a small laboratory animal over an extended period of time is provided with a liquid dispensing section that has a liquid delivery tube and sipping tube combination, that retains a drop/droplet of the potable liquid in a position accessible to the animal, and that replaces each drop/droplet of liquid ingested by the animal with a succeeding drop/droplet of liquid, counting the total number of drops/droplets ingested by the animal over an extended period of time.

12 Claims, 2 Drawing Sheets

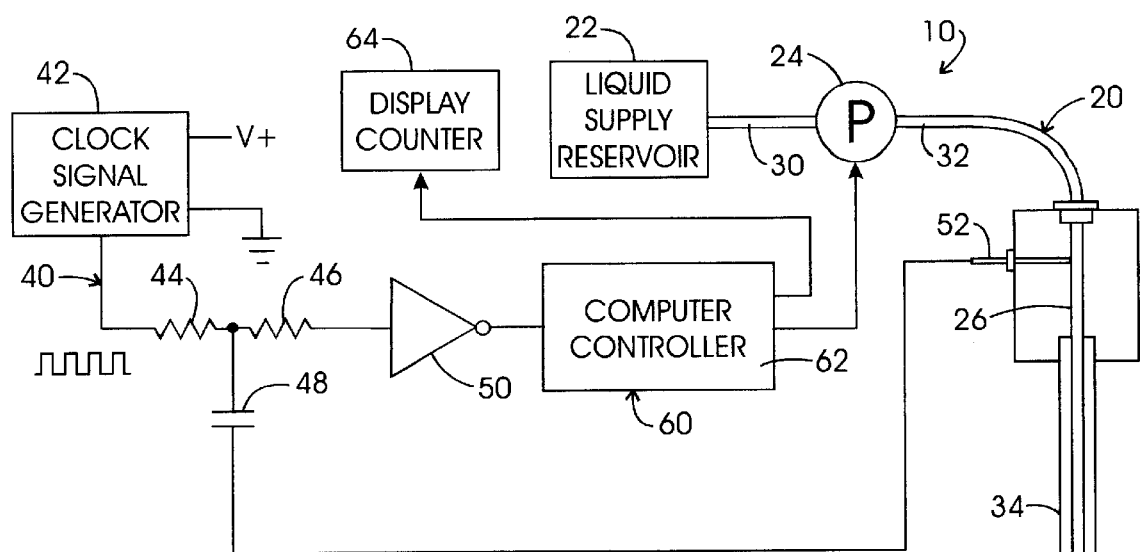
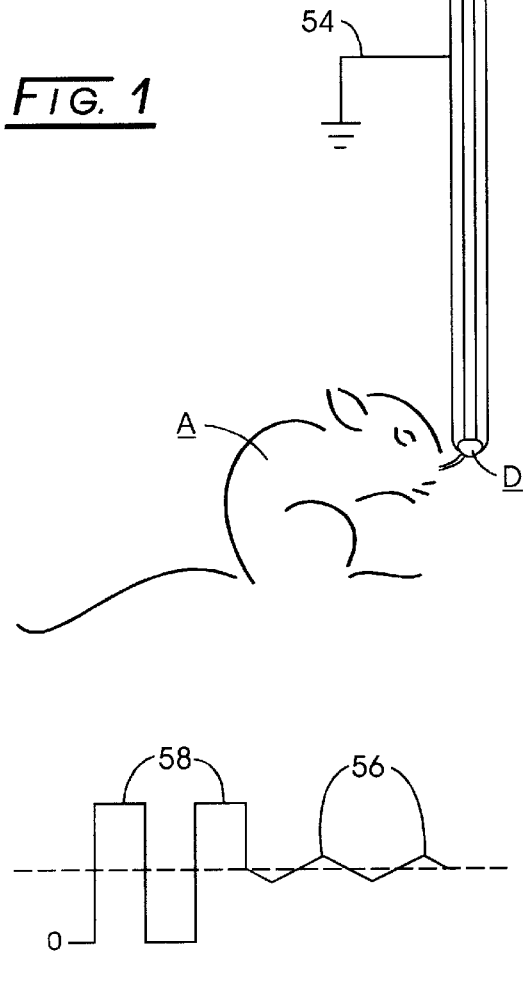
FIG. 1
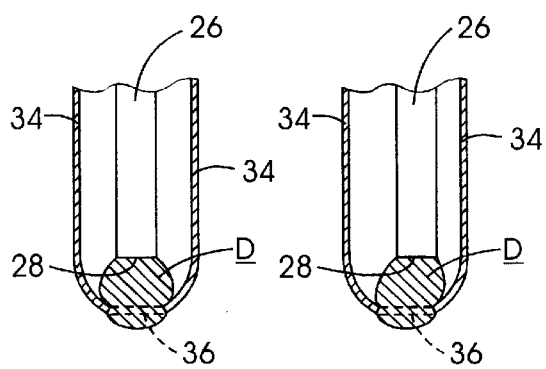
FIG. 2A  FIG. 2B
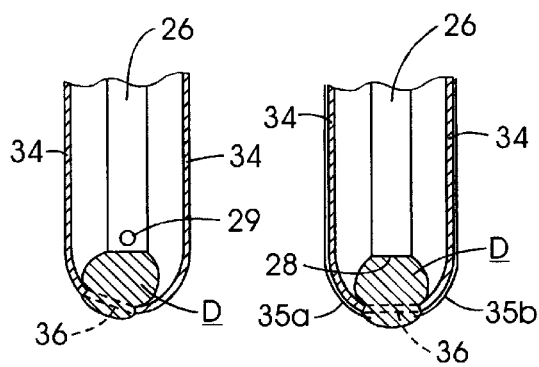
FIG. 2C  FIG. 2D
FIG. 3

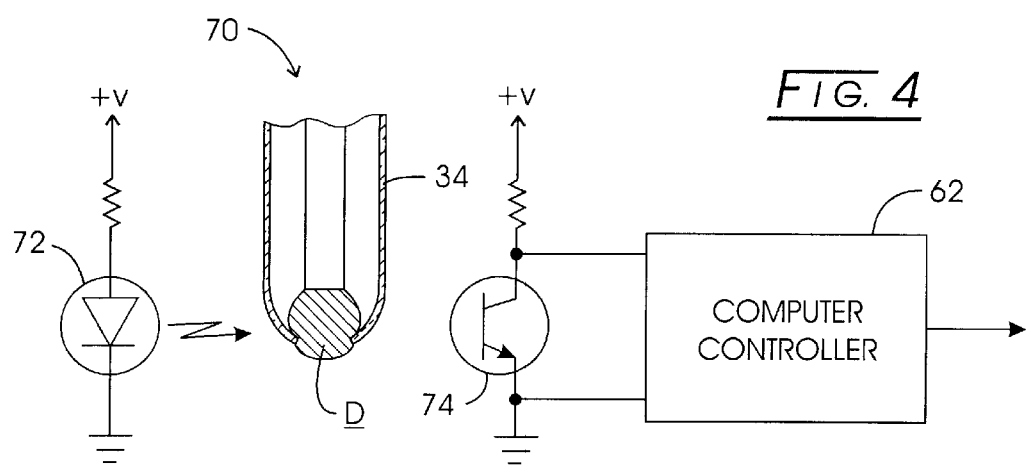
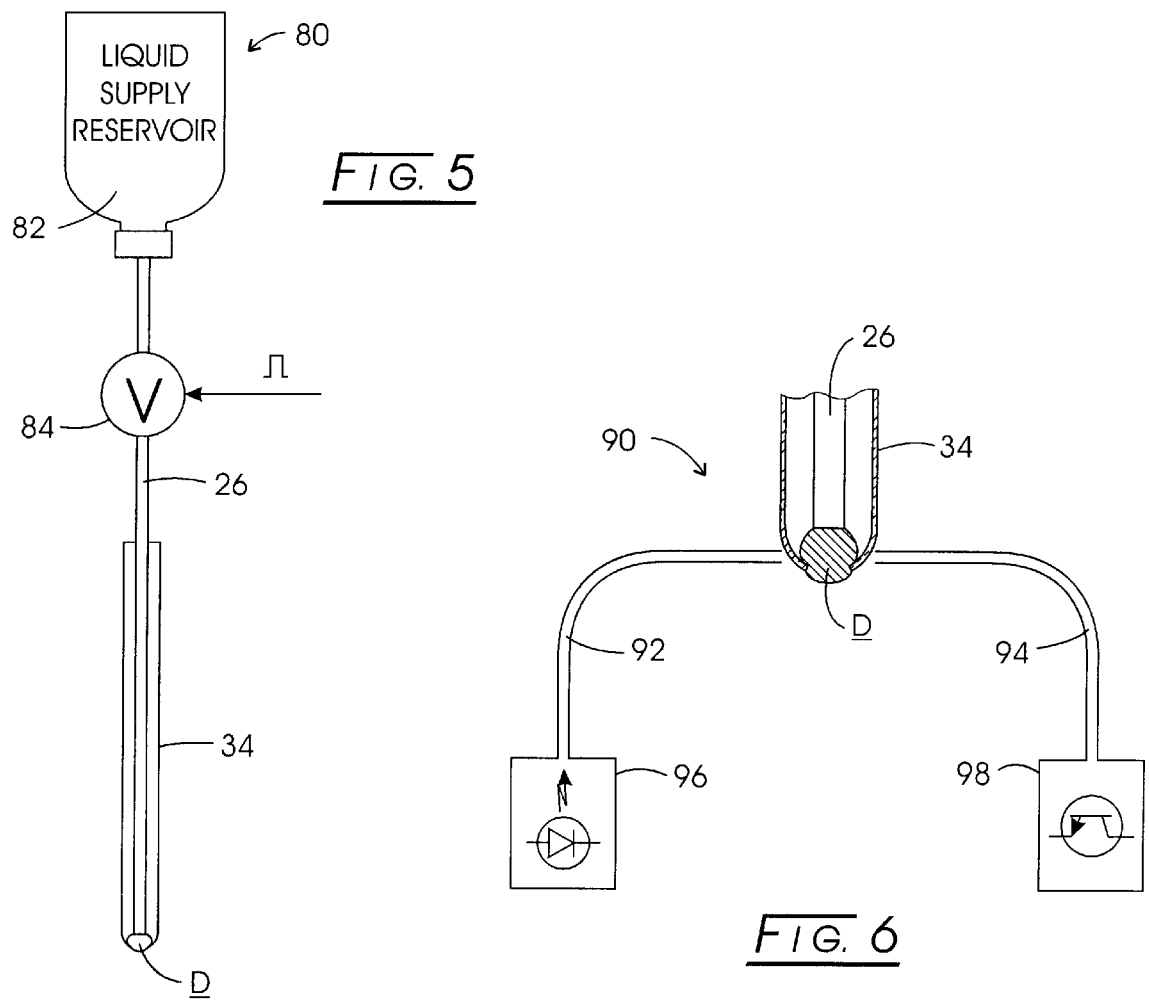

INGESTION MONITORING SYSTEM

CROSS-REFERENCES

None.

FIELD OF THE INVENTION

This invention relates generally to monitoring of liquid intakes by a small animal, and particularly concerns both apparatus and methods that are usefull in connection with research operations requiring the detection and precision measurement of a liquid ingested by a small laboratory animal over an extended period of time.

BACKGROUND OF THE INVENTION

There are two well-known classical methods for measuring the volume of liquid ingested by a laboratory animal. The first such method counts animal licks of the liquid-dispensing device. Each time an animal lick of the sipping tube occurs a tube lick counter is activated, and subsequently the total lick count is used in arithmetically determining the total amount of liquid ingested by the animal over the period of time involved by multiplying the lick count by a presumed unit liquid volume intake per animal lick of the sipping tube. A determination accuracy problem frequently arises when the animal sucks on the sipping tube rather than licking it and therefore consumes more that the presumed per lick volume, e.g. a presumed or assumed one drop/droplet per lick.

The second method utilizes a precision weight scale to measure the amount of liquid ingested by providing an animal weight readout. Unfortunately, stray vibrations imparted to the weight scale adversely affects accuracy of measurement. Also, such precision weight scales are extremely expensive.

A principal objective of our liquid ingestion monitoring system invention is to provide apparatus which precisely detects the amount of liquid ingested by a small laboratory animal over a known period of time.

Another objective of the present invention is to provide a precision small animal liquid ingestion detection apparatus that is relatively inexpensive to build and operate.

A still further object of our invention is to provide an associated computational method for determining volume of liquid ingestion by a small laboratory animal that does not rely on a presumed unit intake value.

Other objects and advantages of the present invention will become apparent when considering the detailed descriptions, drawings, and claims which follow.

SUMMARY OF THE INVENTION

The system apparatus of the present invention basically consists of: a liquid dispensing section (subassembly) that pumps an individual predetermined small volume (i.e., a drop/droplet) of a potable liquid from a liquid reservoir to the open end of a dispensing section delivery tube element for retention and subsequent ingestion by a small laboratory animal; a sensor section that detects each absence of a potable liquid drop/droplet previously retained at the open end of the liquid dispensing section delivery tube element following its ingestion by the small laboratory animal; and a co-operating controller section that, in response to the sensor section detecting the absence of a previously retained drop/droplet of potable liquid at the delivery tube element open end causes the liquid dispensing section to pump another liquid drop/droplet from the potable-liquid reservoir to the liquid dispensing section delivery tube element.

The apparatus of the present invention also includes a system resettable counter element that indicates, for the period of time involved, the number of times the system controller section causes the system liquid dispensing section to pump an individual predetermined liquid amount to the liquid dispensing section delivery tube. An accurate or precise determination of the total volume of liquid actually ingested by the animal can then be calculated using the count of the system counter element and the precisely known unit volume (i.e., drop/droplet volume) pumped into the system liquid dispensing section delivery tube element from the system potable-liquid reservoir.

BRIEF DESCRIPTION OF THE DRAWINGS

FIG. 1 schematically illustrates a preferred embodiment of the ingestion monitoring system of the present invention;

FIG. 2A is an enlarged elevation view, partially in section, of a portion of the system combined liquid delivery tube and sipping tube elements of the FIG. 1;

FIG. 2B is similar to FIG. 2A but relates to an alternate system liquid delivery tube and sipping tube element combination arrangement;

FIG. 2C is also similar to FIG. 2A but relates to a still further alternate system liquid delivery tube and sipping tube element arrangement;

FIG. 2D is also similar to FIG. 2A but illustrates a sensing circuit independent of the system liquid delivery tube and sipping tube elements;

FIG. 3 schematically illustrates serial drop/droplet presence and absence sensing signals generated by the FIG. 1 system;

FIG. 4 schematically illustrates an alternate sensor subassembly that may be incorporated into the FIG. 1 system invention;

FIG. 5 schematically illustrates an alternate liquid dispensing section that may be incorporated into the FIG. 1 system invention; and FIG. 6 is similar to FIG. 4 but illustrates an alternate drop/droplet sensor subassembly that may be incorporated into the FIG. 1 system invention.

DETAILED DESCRIPTION

FIG. 1 schematically illustrates a preferred embodiment 10 of the ingestion monitoring system of the present invention, such being comprised of a liquid dispensing section 20, a co-operating drop/droplet sensor section 40, and a system conventional controller or computer section 60 that responds to the signal output of the sensor section to intermittently actuate the system liquid dispensing section. Liquid dispensing section 20 includes a liquid supply reservoir 22, a positive displacement pump 24 which, when actuated by a control section output pulse, pumps an accurately predetermined drop/droplet volume of liquid from liquid supply reservoir 22 to liquid delivery tube 26 having a small open end 28. Fluid flow lines 30 and 32 connect pump 24 to reservoir 22 and liquid delivery tube 26 to pump 24, respectively. A sipping tube element 34 surrounds and is spaced-apart from liquid delivery tube 26, and functions in-part to cause each drop or droplet D of liquid pumped into fluid flow line 30 and ultimately to the open-end 28 (see FIG. 2A) of delivery tube 26 to be retained by the end opening 36 of sipping tube 34 which is in a location accessible to the small laboratory animal A.

Positive displacement pump element 24 may take any one of several different particular forms including peristaltic, diaphragm, or syringe with stepping motor pump types, and preferably delivers a predetermined volume of liquid in the micro-volume range of 20 to 40 micro-liters (i.e., 0.00002 liter to 0.00004 liter) in response to each received pump input control pulse received from the system controller section 60. Also, liquid delivery tube element 26 and sipping tube 32 of system 10 are each electrically conductive, and preferably are manufactured of a stainless steel alloy or alternatively of a metal-coated or impregnated plastic or glass. In one actual embodiment of system 10 liquid delivery tube 26 was fabricated of 15-gauge hypodermic needle stainless steel stock having a nominal internal diameter of 0.060 inches (1.52 millimeters) and an nominal external diameter of 0.072 inches (1.83 millimeters). Sipping tube element 34 in the system actual embodiment also was fabricated of stainless steel and had a nominal outside diameter of 0.3125 inch (7.93 millimeters), a nominal wall thickness of 0.020 inch (0.51 millimeters), and an end opening 36 diameter in the range of 0.040 to 0.070 inches (1.02 to 1.78 millimeters), the exact diameter selected depending upon viscosity and surface tension properties of the liquid to be dispensed. Generally, end-opening 28 of delivery tube 26 is positioned so that its edge is no farther than approximately 0.1 inch (2.5 millimeters) from the closest edge of end-opening 36 of sipping tube element 34.

Drop/droplet sensor section 40 in the FIG. 1 scheme is basically comprised of an electronic clock signal generator 42, resistor 44, resistor 46, capacitor 48, and a voltage amplitude comparator device such as Schmidt trigger 50. As shown, capacitor 48 also is electrically connected to liquid delivery tube 26 by electrical connection 52; sipping tube 34 is electrically connected to ground 54.

When a drop/droplet D of electrically conductive liquid such as ordinary tap water is retained at end-openings 28 and 36 of liquid delivery tube 26 and sipping tube 34, an electrical connection of capacitor 48 to ground 54 is completed through the connected conductive delivery tube, the end-retained liquid drop/droplet, and the conductive sipping tube 36. As a result of the capacitor-to-ground connection, the system clock pulses transmitted through resistor 46 and to Schmidt trigger 50 are the low-amplitude integrated sensor output pulses 56 shown in FIG. 3. However, when small laboratory animal A takes and ingests the liquid drop/droplet D from the end opening 36 of sipping tube 34, the capacitor-to-ground connection is broken and the resulting charging of capacitor 48 causes the sensor clock signals inputted to device 50 to be the high-amplitude pulses 58 of FIG. 3. Whenever an increasing clock signal voltage amplitude change is sensed by circuit trigger 50 a sensor output pulse is inputted to conventional controller 62 to cause subsequent actuation of pump 24 for a single output stroke and actuation of counter 64 for a single digit count increase.

As shown in FIG. 2A, the longitudinal axes of liquid delivery tube 26 and sipping tube 34 preferably coincide. However, in some applications of ingestion monitoring system 10 it may be advantageous to offset those axes slightly with respect to each other as shown in FIG. 2B. Also, and as shown in FIG. 2C, in still other embodiments of ingestion monitoring system 10 it may be advantageous to discharge liquid from delivery tube 26 through a side-wall opening or hole 29 rather than through a tube end-opening 28. FIG. 2D illustrates an embodiment where deliver tube 26 and sipping tube 34 are formed from non-conductive material such as plastic and a pair of spaced electrodes 35a and 35b extend down the outside of sipping tube 34 and terminate on opposite sides of end opening 36. In some instances electrodes 35a and 35b may project into the space between end openings 28 and 36 of liquid delivery tube 26 and sipping tube 34. Of course, one or both electrodes 35a and 35b could be positioned inside of sipping tube 34. Also, only one electrode may be used where one of the delivery tube 26 and the sipping tube 34 are formed from a conductive material.

FIG. 4 schematically illustrates details of an alternate arrangement for the construction of the system sensor section. Such is referenced by the numeral 70 and its principal components are a light source such as separately energized light emitting diode (LED) 72 positioned to one side of sipping tube 34 and a conventional photosensor diode or photo transistor cell 74 positioned to receive light rays from LED 72 that are either transmitted through or back-scattered from the lower extreme of sipping tube 34. In such alternate arrangement tube elements 26 and 34 need not be electrically conductive but sipping tube 34 must be optically transparent. Conventional photosensor diode cell 74 is selected so that its sensitivity results in the inputting of a reduced voltage signal to system controller/computer 62 whenever it senses an increase in light ray level of intensity due to the lack of light transmission obstruction by the absence of a liquid drop/droplet D otherwise retained in the zone between the free ends of liquid delivery tube 28 and sipping tube 34. The FIG. 4 type of invention ingestion monitoring system is especially useful in applications wherein the liquid being dispensed is electrically non-conductive such as occurs when distilled water is to be dispensed through system delivery and sipping tubes 26 and 34.

FIG. 5 illustrates another form of liquid dispensing section for ingestion monitoring system 10. Such is referenced by the numeral 80 and is comprised of liquid supply reservoir 82, liquid metering valve 84, and a co-operating liquid delivery tube 28 and sipping tube 34 combination. Liquid supply reservoir 82 differs from liquid supply reservoir 22 in that it must maintain the fluid within at a constant pressure at all operating times. Metering valve 84 is normally closed but when actuated by a command signal received from system controller/computer section 60 is opened for a unitary period of time having a duration that is fixed by the controller/computer section. Thus, knowing the reservoir constant pressure and the time duration of the valve open period, the volume of the liquid drop/droplet flowed from liquid supply reservoir 82 to liquid delivery tube 26 can be precisely predetermined as in the case of actuation of liquid pump 24.

A still further system drop/droplet sensor section construction variation 90 is schematically illustrated in FIG. 6. In the FIG. 6 arrangement bundles 92 and 94 of optic fibers are utilized to transmit light from a light source such as LED 96 to the zone occupied by the open ends of system tubes 26 and 34 and from that end zone to photovoltaic cell element 98, respectively.

Various changes may be made to the shape, proportionate size, materials of construction of the invention elements described in detail in the foregoing detailed description, and substitutions may be made for the various disclosed invention elements with their functional equivalents, without departing from the meaning, scope, or intent of the claims which follow.

We claim as our invention:

1. An ingestion monitoring system for determining the amount of liquid ingested by a small laboratory animal in drop/droplet quantities over a period of time, and comprising a liquid dispensing section consisting of a liquid supply reservoir element, a positive displacement pump element connected to said liquid supply reservoir element and intermittently pumping a discrete liquid drop/droplet in response to each received pump command signal, a liquid delivery tube element connected to said positive displacement pump element to receive liquid individual discrete drop/droplet volumes from said positive displacement pump element, and a sipping tube element surrounding and spaced-apart from said liquid delivery tube element;

a drop/droplet sensor section co-operating with said liquid dispensing section and sensing and producing a separate output signal for each absence and for each presence of a liquid drop/droplet in a zone between the ends of said liquid delivery tube element and said surrounding and spaced-apart sipping tube element; and a controller section having an event counter element, co-operating with said drop/droplet sensor section, and responsive to said drop/droplet sensor section output signals to produce a pump command signal, said controller section producing and inputting a discrete pump command signal to said positive displacement pump whenever said drop/droplet sensor section senses the absence of a liquid drop/droplet in a zone between the ends of said liquid delivery tube and said surrounding and spaced-apart sipping tube.

2. The ingestion monitoring system defined by claim 1, wherein said liquid dispensing section liquid delivery tube and sipping tube elements are each electrically conductive, wherein the liquid contained in said liquid supply reservoir is electrically conductive, and wherein said drop/droplet sensor section produces a discrete output signal whenever the electrical circuit between said liquid delivery tube element and said sipping tube element is made discontinuous by the absence of liquid in a zone between the ends of said liquid delivery tube and sipping tube elements.

3. The ingestion monitoring system defined by claim 1, wherein said liquid dispensing section sipping tube element is optically transparent, wherein said drop/droplet sensor section includes a light-ray source element and a light-ray receiver element, and wherein said drop/droplet sensor section produces a discrete output signal that is inputted to said controller section whenever light rays emitted from said light-ray source element are transmitted through said optically transparent sipping tube element and received at said light-ray receiver element with increased intensity because of the absence of liquid in a zone between the ends of said liquid delivery tube and sipping tube elements.

4. The ingestion monitoring system defined by claim 1, wherein said liquid dispensing section sipping tube element is optically transparent, wherein said drop/droplet sensor section includes a light-ray source element and a light-ray receiver element, and wherein said drop/droplet sensor section produces a discrete output signal that is inputted to said controller section whenever light rays emitted from said light-ray source element and reflected from said optically transparent sipping tube element are received at said light-ray receiver element with decreased intensity because of the absence of liquid in a zone between the ends of said liquid delivery tube and sipping tube elements.

5. The ingestion monitoring system defined by claim 1, wherein said liquid dispensing section sipping tube element is optically transparent, wherein said drop/droplet sensor section includes a light-ray source element, a light-ray receiver element, and a pair of elongated optic fiber bundles, and wherein light rays transmitted from light-ray source element to said optically transparent sipping tube element and from said optically transparent sipping tube element to said light-ray receiver element are transmitted sequentially through said pair of elongated optic fiber bundles.

6. The ingestion monitoring system defined by claim 1, and wherein said liquid dispensing section liquid delivery tube element has a longitudinal axis that coincides with the longitudinal axis of said surrounding and spaced-apart sipping tube element.

7. The ingestion monitoring system defined by claim 1, and wherein said liquid dispensing section liquid delivery tube element has a longitudinal axis that is laterally offset with respect to the longitudinal axis of said surrounding and spaced-apart sipping tube element.

8. The ingestion monitoring system defined by claim 1, wherein said drop/droplet sensor section comprises at least one electrode made of a conducting material.

9. The ingestion monitoring system defined by claim 8, wherein said electrode extends externally of said sipping tube element.

10. The ingestion monitoring system defined by claim 8, wherein said electrode extends internally of said sipping tube element.

11. In a method of monitoring the ingestion of a potable liquid by a small laboratory animal over an extended period of time, the steps of:

steps of providing a potable-liquid drop/droplet of predetermined volume at a location accessible to the small laboratory animal;

sensing the absence of said potable-liquid drop/droplet of predetermined volume at said location accessible to the small laboratory animal and generating a discrete drop/droplet replacement signal;

providing a replacement potable-liquid drop/droplet of said predetermined volume at said location accessible to the small laboratory animal in response to each said generated discrete drop/droplet replacement signal; and counting the total number of discrete drop/droplet replacement signals generated over the extended period of time.

12. The method invention defined by claim 9, and comprising the further step of arithmetically computing the volume of potable liquid ingested by the small laboratory animal over the extended period of time by multiplying the total number of discrete drop/droplet replacement replacements signals generated by said predetermined volume of each said replacement potable-liquid drop/droplet.

* * * * *